US012683282B2

(12) United States Patent
Leung et al.

(10) Patent No.: US 12,683,282 B2
(45) Date of Patent: Jul. 14, 2026

(54) FOUR-PORT OMNIDIRECTIONAL ANTENNA

(71) Applicant: City University of Hong Kong, Kowloon (HK)

(72) Inventors: Kwok Wa Leung, Kowloon Tong (HK); Xu Han, Kowloon Tong (HK); Peng Fei Hu, Guangzhou (CN)

(73) Assignee: City University of Hong Kong, Kowloon (HK)

( * ) Notice: Subject to any disclaimer, the term of this patent is extended or adjusted under 35 U.S.C. 154(b) by 94 days.

(21) Appl. No.: 18/965,953

(22) Filed: Dec. 2, 2024

(65) Prior Publication Data

US 2026/0155572 A1 Jun. 4, 2026

(51) Int. Cl.
*H01Q 9/04* (2006.01)
*H01Q 5/35* (2015.01)
*H01Q 21/20* (2006.01)

(52) U.S. Cl.
CPC ............. *H01Q 9/0485* (2013.01); *H01Q 5/35* (2015.01); *H01Q 21/205* (2013.01)

(58) Field of Classification Search
CPC ....... H01Q 5/35; H01Q 9/0485; H01Q 21/205
See application file for complete search history.

(56) References Cited

U.S. PATENT DOCUMENTS 11,652,291 B2 5/2023 Leung et al.
11,670,859 B1 6/2023 Leung et al.
11,710,908 B2 7/2023 Cao et al.
2012/0212386 A1* 8/2012 Massie .................. H01Q 1/243 343/850
2021/0066816 A1* 3/2021 Leung ...................... H01Q 1/50

FOREIGN PATENT DOCUMENTS

CN 209948042 U 1/2020
CN 114914697 A 8/2022

* cited by examiner

*Primary Examiner* — Daniel Munoz
(74) *Attorney, Agent, or Firm* — Polsinelli PC; Gregory P. Durbin

(57) ABSTRACT

A four-port omnidirectional antenna comprising a dielectric resonator, a first substrate and a second substrate. The first substrate comprising two sets of feed lines adapted for providing two transverse magnetic (TM) modes, one of which is provided in a higher order. The second substrate also comprises two sets of feed lines adapted for providing two transverse electric (TE) modes, one of which is provided in higher order. The dielectric resonator, the first substrate and the second substrate are stacked with each other to form a double-layer printed circuit board (PCB), and the feed lines are configured to isolate fields excited by each of the two TM modes and the two TE modes, thereby enabling independent operation between each of the two TM modes and the two TE modes.

19 Claims, 7 Drawing Sheets

FOUR-PORT OMNIDIRECTIONAL ANTENNA

TECHNICAL FIELD

The present invention relates to omnidirectional antennas. In particular, the present invention relates to a four-port omnidirectional antenna for exciting four omnidirectional modes.

BACKGROUND

With the development of contemporary communication, the demand for data transmission is increasing. Duplex antennas are becoming increasingly meaningful for research as they can simultaneously receive and transmit data, reducing the number of antennas at the terminal.

Traditional duplex antennas mostly require integration with other structures. Coupler, coplanar waveguides, substrate-integrated waveguides, parasitic structures and resonant structures are often seen in the design of duplex antennas, which will increase the size and complexity of the terminal system.

As to single antenna unit that can independently realize the duplex function without other structures, some emerging duplex antennas have also been proposed in recent years, but they have rather complex structure. Besides, they cannot be applied in the operating frequency band of the base station with all modes have omnidirectional radiation pattern.

SUMMARY OF THE INVENTION

According to a first aspect of the present invention, there is provided a four-port omnidirectional antenna comprising: (i) a dielectric resonator, (ii) a first substrate contact with the dielectric resonator, comprising a first set of feed lines adapted for providing a fundamental transverse magnetic (TM) mode in a lower frequency band and a second set of feed lines adapted for providing a high-order TM mode in a higher frequency band; (iii) a second substrate in contact with the first substrate, comprising a third set of feed lines adapted for providing a fundamental transverse electric (TE) mode in the lower frequency band, and a fourth set of feed lines adapted for providing a high-order TE mode in the higher frequency band; wherein the first, second, third and fourth set of feed lines are configured to isolate fields excited by each of the two TM modes and the two TE modes, thereby enabling independent operation between each of the two TM modes and the two TE modes.

In an embodiment, the antenna is a duplex antenna adapted to receive and transmit data simultaneously at any two of the two TM modes and two TE modes at two distinct frequency bands.

In an embodiment, the first set of feed lines is electrically interconnected and fed by a first power divider to form a first feed network.

In an embodiment, the first power divider is disposed radially between the third set of feed lines and the fourth set of feed lines on the second substrate, and comprises circumferentially extending arc strips with cascading structures along the radial direction adapted to provide a first order and a second order of power division.

In an embodiment, the circumferentially extending arc strips include a first arc strip adapted to provide a first order of power division, wherein the first arc strip has a circumferential span of 180 degrees.

In an embodiment, the first set of feed lines comprises four stubs extending radially in an outer region relative to the second set of feed lines, and wherein each of the four stubs is separated from each other by an angular span of 90 degrees.

In an embodiment, the second set of feed lines is fed from a central via with a circular patch to form a second feed network.

In an embodiment, the second set of feed lines comprises four shorting stubs extending radially outwardly at the centre of the first substrate, wherein the four shorting stubs are positioned orthogonally to each other while being connected to each other at the centre patch.

In an embodiment, the third set of feed lines is electrically interconnected and fed from a second power divider to form a third feed network.

In an embodiment, the second power divider is disposed in an outermost region of the second substrate.

In an embodiment, the third set of feed lines comprises a first loop consisting of four discrete angular strips in an outer region relative to the fourth set of feed lines, wherein each of the four discrete angular strips of the first loop has a first arc length defined by a first subtended angle.

In an embodiment, the fourth set of feed lines is electrically interconnected and fed by a third power divider to form a fourth feed network.

In an embodiment, the third power divider is positioned at an innermost region of the second substrate.

In an embodiment, the fourth set of feed lines comprises a second loop comprising of four discrete angular strips in an inner region relative to the third set of feed lines, wherein each of the four discrete angular strips of the second loop has a second arc length defined by a second subtended angle.

In an embodiment, the antenna further comprising a grounded coplanar waveguide (GCPW) structure positioned around the third power divider on the second substrate to reduce cross-polarization.

In an embodiment, the antenna further comprising a filter structure comprising an arc adapted to eliminate coupling between the first set of feed lines and the second set of feed lines, wherein the arc has a dimension comparable to a wavelength associated with the frequency band of the high-order TM mode.

In an embodiment, the first substrate and the second substrate are circular and planar, and are stacked on a common axis of rotation.

In an embodiment, the dielectric resonator is in a shape of a cylinder, and is formed of a material having a dielectric constant of 5.

In an embodiment, the two distinct frequency bands include a first frequency band of 1.8 Ghz and a second frequency band of 3.9 Ghz.

According to a second aspect of the present invention, there is provided a four-port omnidirectional antenna which has a dielectric resonator with a lower dielectric constant of 5 and two-layer PCB, four omnidirectional DR modes are excited by one resonator, two modes corresponding to two orthogonal polarization are excited at one band.

In an embodiment, any two modes can be chosen for duplex application, they can work almost without interference.

In an embodiment, the antenna is very compact and can be easily applied to base station communication systems.

The four-port omnidirectional antenna according to an embodiment of the present invention comprises four sets of feed lines positioned on a double-stepped substrate to provide four omnidirectional modes. The four sets of feed lines are positioned and structured such that the field distributions of the four omnidirectional modes are naturally orthogonal to each other, resulting in high isolation between them. This allows the four modes to operate with good in-band and inter-band isolation.

In particular, when operating as a duplex antenna, the high isolation between the four modes allows any two modes to be selected to operate simultaneously, which is of great importance in simplifying the duplex antenna system.

BRIEF DESCRIPTION OF THE DRAWINGS

Embodiments of the present invention will now be described, with respect to the accompanying figures.

DETAILED DESCRIPTION OF THE EMBODIMENTS

Dielectric resonant antennas (DRA) are comparatively easier to implement than other antenna types when three or more modes are required. A fixed size, fixed material DRA can achieve excitation of multiple modes (including multiple orthogonal modes) under different feeding methods. By exploiting this characteristic, it is possible to excite the same dielectric resonator through different ports, thus realising the design of multi-frequency and multi-polarisation antennas. In addition, DRA has advantages such as compact structure, low loss, flexible shape and various feeding methods.

In order to be well applied to base stations, signals from all directions need to be received and transmitted. An embodiment of the present invention relates to an omnidirectional four-port full duplex antenna which can cover N3 and N77 operating bands in FR1 and excites four omnidirectional modes using four ports. Different modes can operate independently, with isolation levels close to or below −20 dB. The proposed antenna will be of great significance to the simplification of duplex system.

Figure 1:
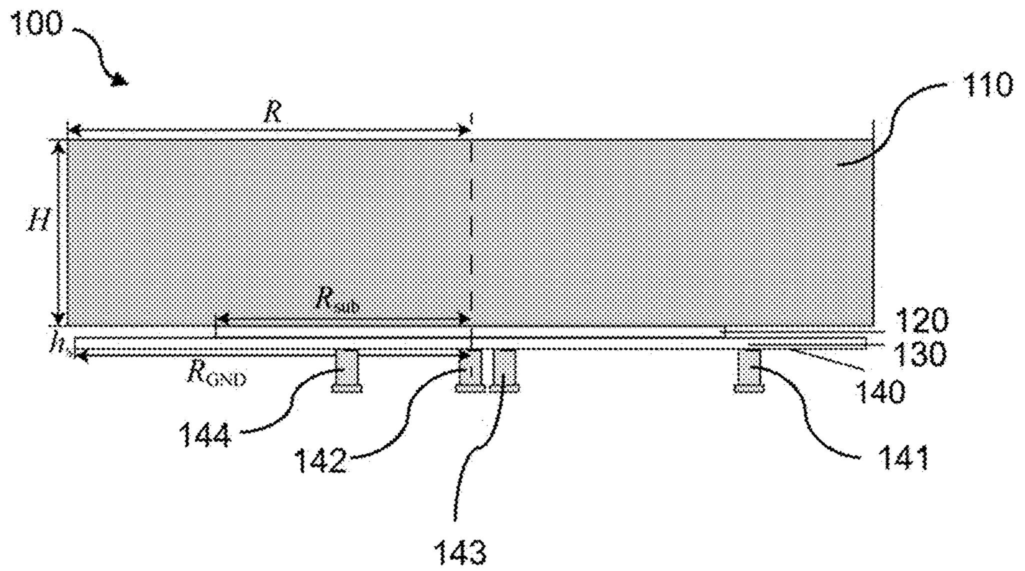
FIG. 1 shows a side view of an embodiment of a four-port omnidirectional antenna according to the present invention.
Figure 2:
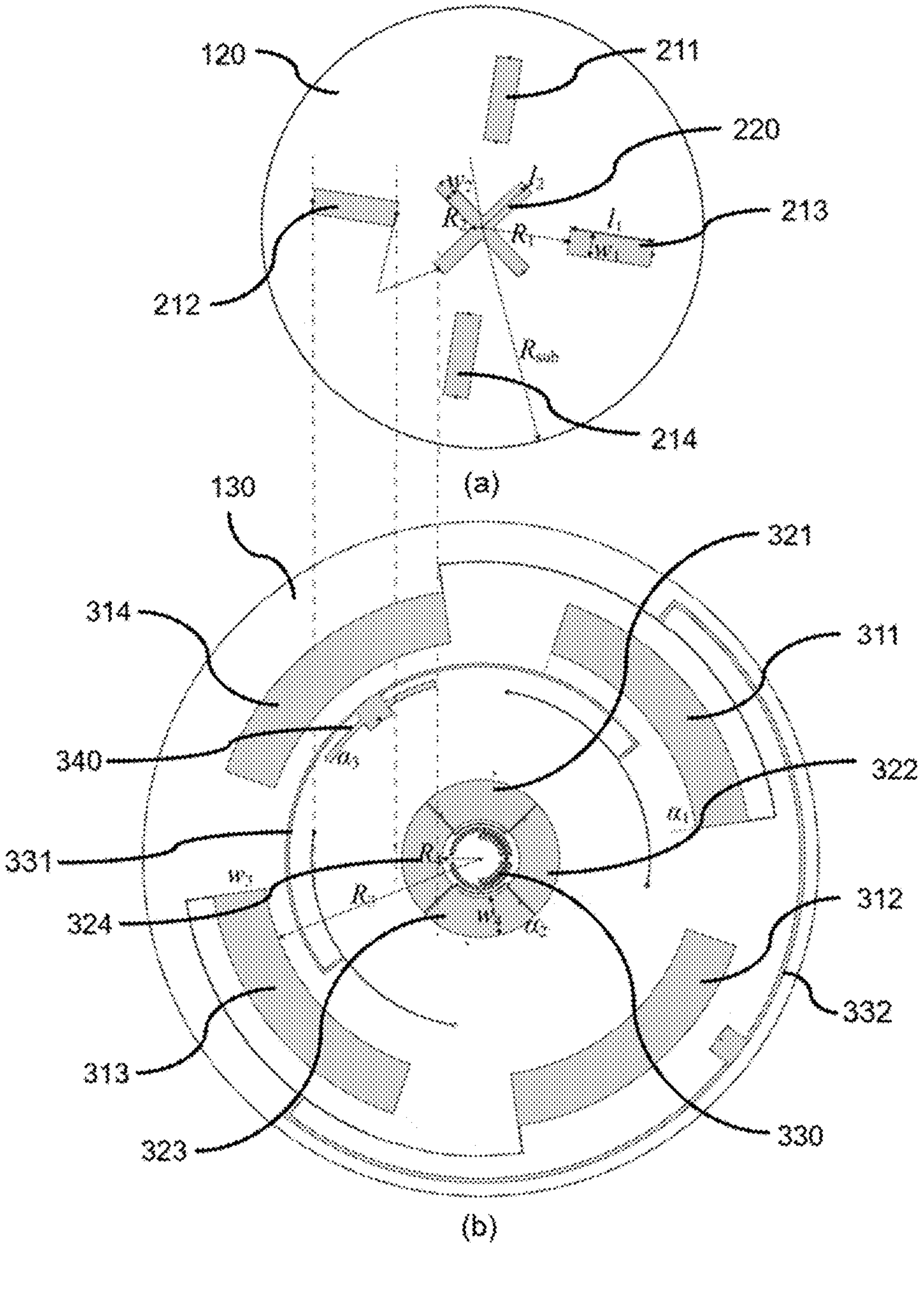
FIG. 2 shows top plan views of a first substrate and a second substrate of the four-port omnidirectional antenna of FIG. 1.

The configuration of an embodiment of the four-port omnidirectional dielectric resonant antenna is shown in FIGS. 1 and 2. Referring to FIG. 1, the antenna 100 comprises a printed cylinder that acts as dielectric resonator 110 and two layers of substrates 120, 130. To realize a wider bandwidth, the dielectric resonator 110 is formed of material with a dielectric constant of 5. Both substrates 120, 130 are formed with printed circuit boards (PCB) of ROGERS RO4003 and are each 1.524 mm thick. The first substrate 120, which is also an upper substrate, is attached to a lower surface of the dielectric resonator 110, while the second substrate 130 is a lower substrate attached to a surface of the first substrate 120. The first substrate 120 is of a smaller planar size than the second substrate 130.

The four ports 141, 142, 143, 144 correspond to four sets of feed networks. The dielectric resonator 110 is excited though these four ports 141, 142, 143, 144 for providing two transverse magnetic (TM) modes and two transverse electric (TE) modes respectively. The feed networks of the first TM mode of a lower frequency band (TM01δ mode) are fed from port 1 144, the feed networks of the second TM mode of a higher frequency band (TM02δ mode) are fed from port 2 142, the feed networks of the first TE mode of a lower frequency band (TE01δ+1 mode) are fed from port 4 141, the feed networks of the second TE mode of a higher frequency band (TE03δ+1 mode) are fed from port 3 143.

As shown in FIG. 2, the feedlines for TM modes are placed on the first substrate 120, while the feedlines for TE modes and a first power divider 331 for the first TM mode are placed on the second substrate 130.

TM and TE modes are very popular in application of WiFi and base station because they both have omnidirectional radiation patterns and the fields of which are orthogonal to each other. It can be seen that the electric fields of TM modes are along the radial direction and are corresponding to vertical polarization, while the electric fields of TE modes are along the φ direction and are corresponding to horizontal polarization.

The first power divider 331 and feed lines which are placed on different substrates are electrically connected through metallized vias. The power divider 331 for the TM01δ mode is disposed on the second substrate 130, radially between the third and the fourth set of feed lines. There is also comprised a filter structure 340 is loaded near the port of TM01δ mode in order to eliminate the coupling between the first set of feed lines and the second set of feed lines. The arc of the filter structure 340 has a size similar to a wavelength of the frequency band of the second TM mode.

Referring now to part (a) of FIG. 2, which shows a top plan view of the first substrate 120, which is circular in shape. There is comprised a first set of feed lines for a first TM mode of a lower frequency band (TM01δ mode) which consists of four stubs 211, 212, 213, 214. One side of the four stubs 211, 212, 213, 214 are fed by metal vias connected with the power divider 331, another side of which is shorted to the ground 140 to form a first feed network.

In an embodiment, the four stubs 211, 212, 213, 214 are of a rectangular shape and extend in a radial direction. They are positioned at an outer region of the first substrate 120 away from the centre, reserving space for the second set of feed lines 220. The four stubs 211, 212, 213, 214 are separated from each other with an angular span of 90 degrees. The length of each of the four stubs are identical.

There is also comprised a second set of feed lines at the centre of the first substrate 120, which provides the second TM mode in a higher frequency band (TM02δ mode).

The second set of feed lines comprises of four stubs 220 shorting with each other orthogonally in the shape of a cross. Each of the four shorting stubs 220 are of identical dimension with each other. The first and second sets of feed lines at the first substrate 120 are rotationally symmetric, while the first substrate 120 and the second substrate 130 are stacked on a common axis of rotation to form a double-layer PCB.

In order that the second set of feed lines do not overlap with the first set of feed lines, the angular span between a stub of the second set of feed lines and a stub 211 of the first set of feed lines is 36 degrees. To form a second feed network, the four shorting stubs 220 is fed from centre metal vias with a circular patch to excite TM02δ mode at 3.9 GHz. The metal vias can feed the four shorting stubs in constant amplitude and in phase. The grounded metal vias can make the impedance matching better and shrink the size of it.

To excite fields of TM modes in dielectric resonator, the first and second set of feed lines extend along radial direction to excite the current similar to the current of dipole.

It is notable that an arc has been incorporated into the first power divider 331 with the objective of mitigating the coupling between the TM01δ and TM02δ modes. The dimensions of the arc are comparable to the wavelength associated with the high-order mode frequency band, thereby enabling it to function as a filter.

Four ports correspond to four sets of feed networks, three of which need one-to-four power dividers 330, 331, 332 to achieve uniform omnidirectional distribution. In order to avoid overlap between feedlines, a double step substrate is chosen. Both of TE feedlines are distributed on lower substrate. All shorted stubs for exciting TM modes are placed on upper substrate. To avoid overlapping, the power divider 331 for TM01δ is distributed on the lower substrates, respectively. It adapts metallized vias for connecting.

Part (b) of FIG. 2 shows a top plan view of a second substrate 130 which comprises of a third set of feed lines and a fourth set of feed lines for providing two TE modes. The third set of feed lines comprises a first loop consisting four angular strips 311, 312, 313, 314 at the outer region of the second substrate 130 away from the centre, for providing the first TE mode in a lower frequency band (TE01δ+1 mode). Each of the four discrete angular strips of the first loop has an arc length defined by a first subtended angle α1. The four angular strips 311, 312, 313, 314 of the third set of feed lines are positioned apart from each other, and are electrically interconnected and fed from a second power divider 332 to form a third feed network.

In the inner region of the second substrate 130 is the fourth set of feed lines, which are for providing the second TE mode in a higher frequency band (TE03δ+1 mode). The fourth set of feed lines is electrically interconnected and fed by a third power divider 330 to form a fourth feed network.

As also shown in FIG. 2(*b*), the fourth set of feed lines comprises a second loop consisting of four discrete angular strips 321, 322, 323, 324 near a central region of the second substrate, such that they do not overlap with the angular strips 311, 312, 313, 314 of the third set of feed lines. Similarly, each of the four angular strips 321, 322, 323, 324 of the fourth set of feed lines are positioned apart from each other, and has an arc length defined by a second subtended angle α2. The arc length of the angular strips of the second loop is shorter than that of the first loop.

Compared to two arcs, HEM21δ mode can be suppressed with four arcs compared to two arcs. To excite fields of TE modes in dielectric resonator, loops consisting of 4 angular strips to approximate the current of the small current loop of the magnetic dipole, which are fed by a 1-4 power divider.

In an embodiment, the second power divider 332 is disposed at the outermost region of the second substrate 130, while the third power divider 330 is disposed near the central portion of the second substrate 130. There is further comprised a grounded coplanar waveguide (GCPW) structure around the third power divider 330 to reduce cross-polarization. Since unwanted radiation and coupling caused by power divider will make radiation pattern worse.

The power dividers 330, 331, 332 comprises circumferentially extending arc strips with cascading structures along the radial direction adapted to provide a first order and a second order of power division, wherein the arc strip for providing a first order of power division has a circumferential span of 180 degrees.

Given the above feeding structures, both horizontal and vertical polarized modes are obtained. Their field distributions are naturally orthogonal to each other, leading to a high isolation between them.

Figure 3:
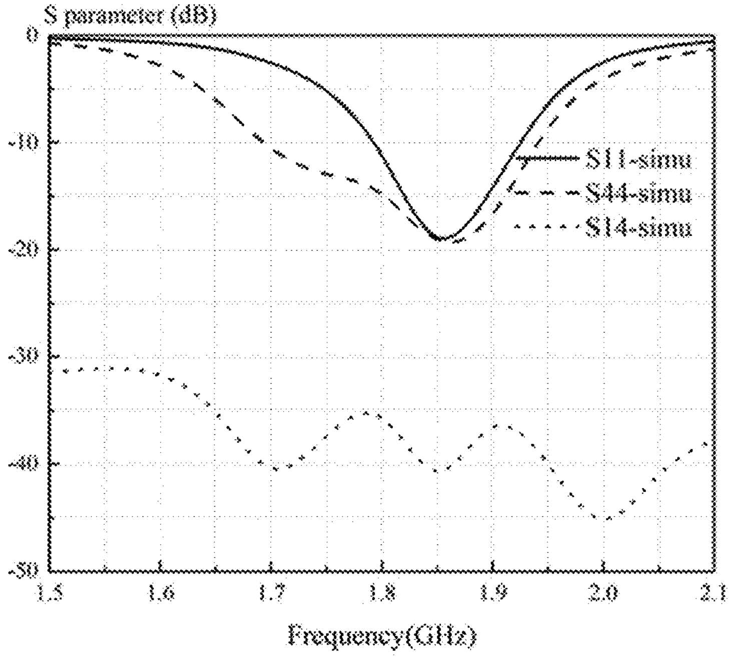
FIG. 3 is a graph showing simulated reflection coefficient and in-band isolation of a four-port omnidirectional antenna according to the present invention, when operated at a lower frequency band.
Figure 4:
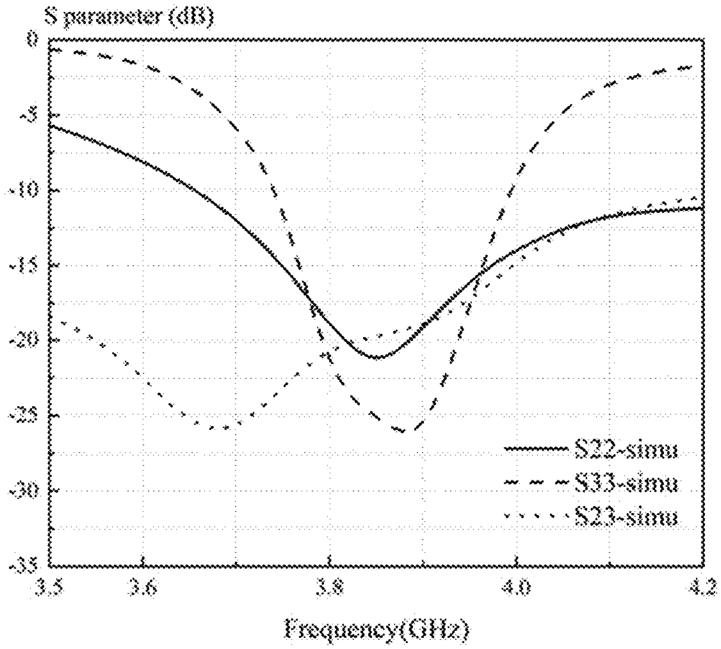
FIG. 4 is a graph showing simulated reflection coefficient and in-band isolation of a four-port omnidirectional antenna according to the present invention, when operated at a higher frequency band.

Referring now to FIGS. 3 and 4 which demonstrates the reflection coefficient and the in-band isolation of each port of the TM and TE modes.

FIG. 3 shows the reflection coefficient and in-band isolation for the lower frequency band. Both lines labelled S11 (port 1) and S44 (port 4) can reach lower than −15 dB at 1.85 GHz, and the bandwidth below −10 dB can cover from 1.80 GHz to 1.92 GHz. The relative bandwidth is 6.5%. According to the figure, S14 (ports 1, 4) is lower than −30 dB in the whole working bandwidth, which shows the good in-band isolation.

FIG. 4 shows the reflection coefficient and in-band isolation of the higher frequency band. It can be seen that both lines labelled S22 (port 2) and S33 (port 3) is below −10 dB during 3.75 GHz to 3.99 GHz, and match well at 3.9 GHz. The relative bandwidth is 6.3%. According to the figure, S23 (ports 2, 3) is lower than −15 dB in the whole working bandwidth and can reach −23 dB at 3.75 GHz.

Considering that there are different frequency bands working simultaneously in the duplex system, the coupling between the bands is also shown.

Figure 5:
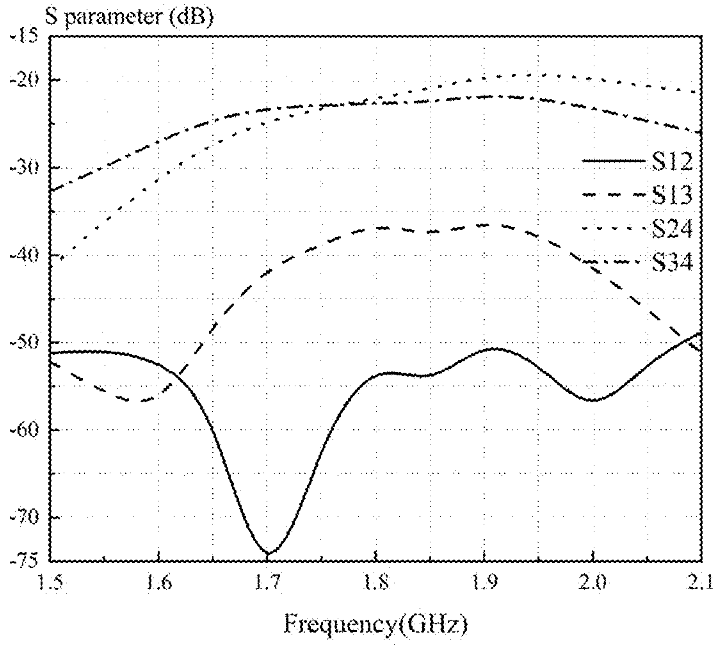
FIG. 5 is a graph showing simulated inter-band isolation of a four-port omnidirectional antenna according to the present invention, when operated at a lower frequency band.
Figure 6:
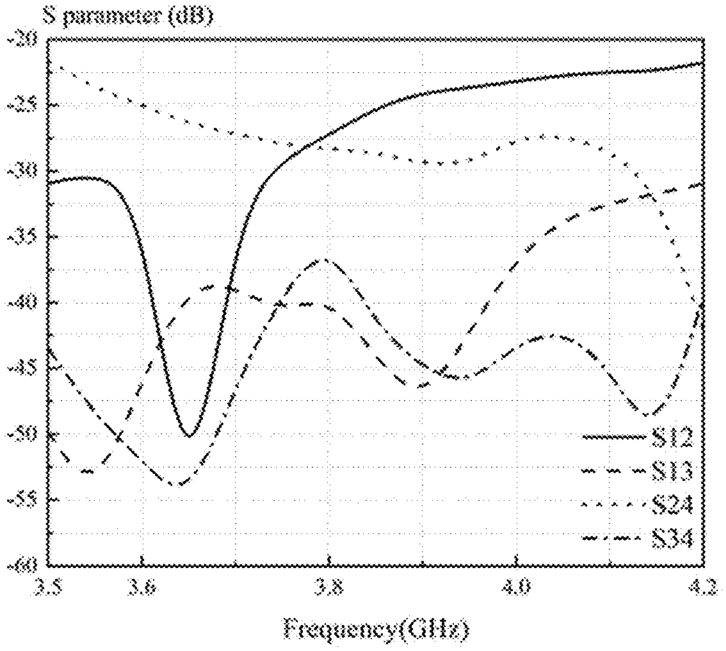
FIG. 6 is a graph showing simulated inter-band isolation of a four-port omnidirectional antenna according to the present invention, when operated at a higher frequency band.

FIGS. 5 and 6 show the isolation of ports working on different frequency bands. FIG. 5 shows inter-band isolation at lower frequency bands, and FIG. 6 shows inter-band isolation at higher frequency bands. It is shown that that almost any two ports have a good isolation below −20 dB in both higher and lower frequency band simultaneously, except S24 is about −19 dB during 1.9 GHz to 1.92 GHz.

Since feedlines of TM01δ mode and TM02δ mode are close to each other and have the same polarization, the coupling between them is serious. In order to eliminate this coupling, a filter structure is loaded near the port of TM01δ mode. Influence of shape and size of the filter structure on the isolation of the two modes is studied.

Figure 7:
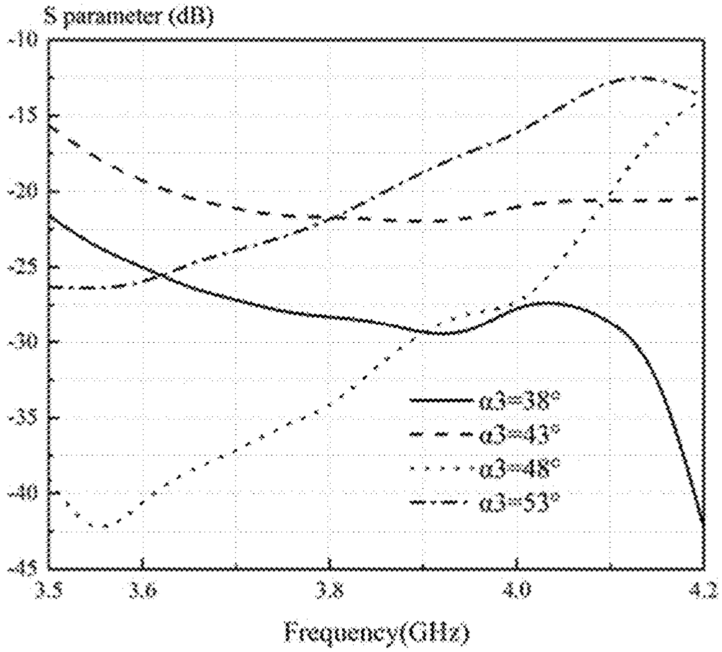
FIG. 7 is a graph showing isolation between TM01δ mode and TM02δ mode changing with the length of the filter structure of a four-port omnidirectional antenna according to the present invention.
Figure 8A:
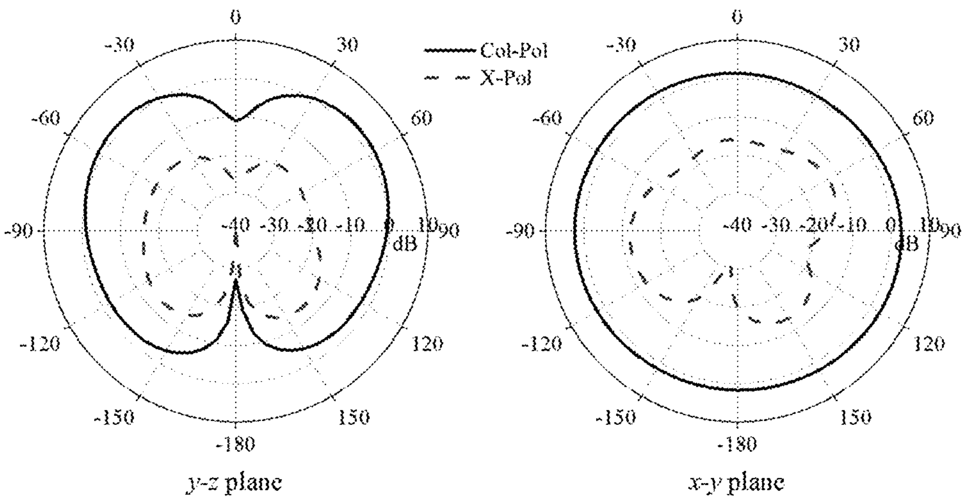
FIG. 8*a* shows radiation patterns at both the y-z and x-y planes of the TE01δ+1 mode of a four-port omnidirectional antenna according to the present invention.
Figure 8B:
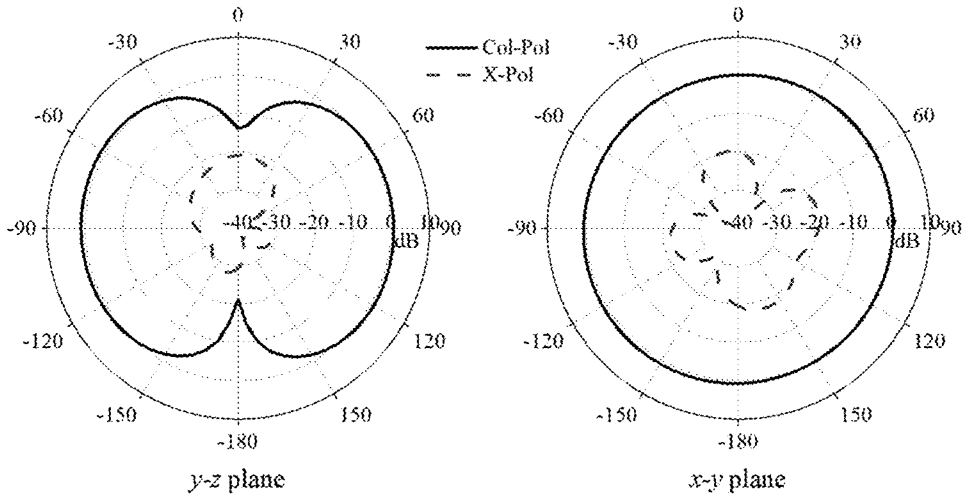
FIG. 8*b* shows radiation patterns at both the y-z and x-y planes of the TM01δ mode of a four-port omnidirectional antenna according to the present invention.
Figure 8C:
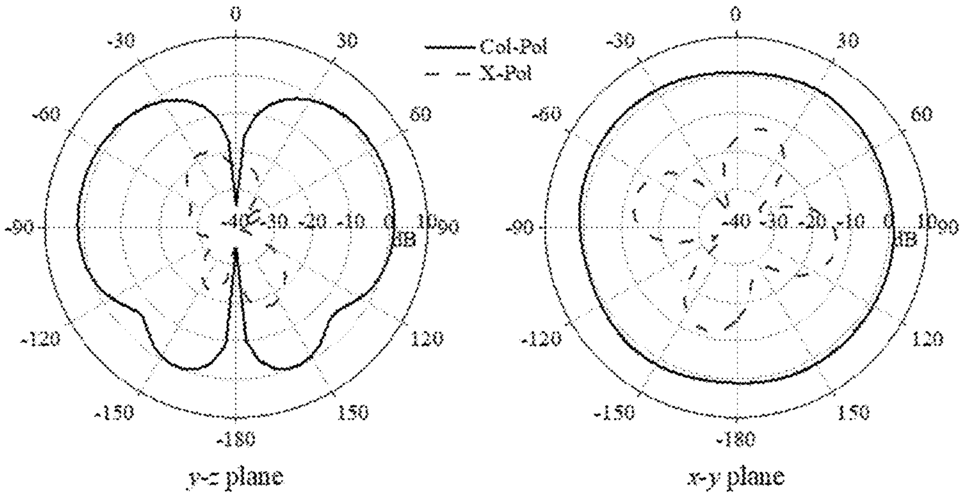
FIG. 8*c* shows radiation patterns at both the y-z and x-y planes of the TM02δ mode of a four-port omnidirectional antenna according to the present invention.
Figure 8D:
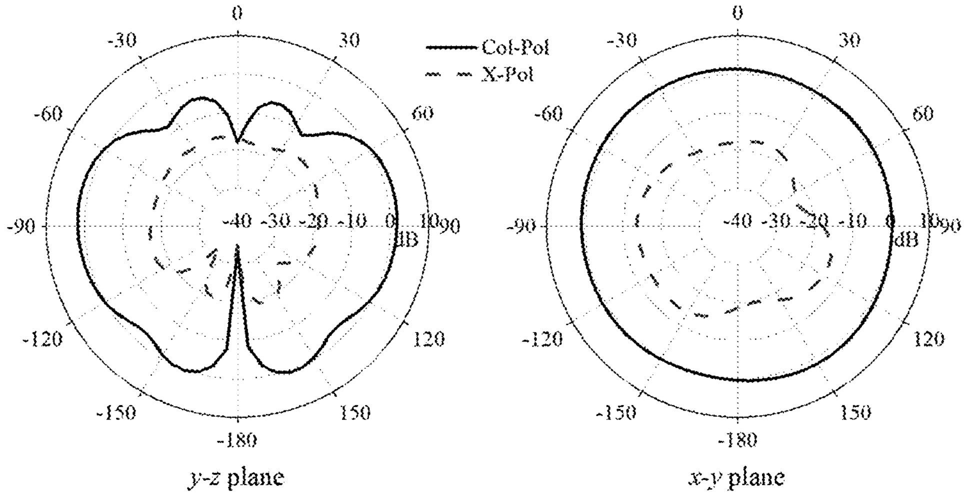
FIG. 8*d* shows radiation patterns at both the y-z and x-y planes of the TE03δ+1 mode of a four-port omnidirectional antenna according to the present invention.

FIG. 7 is a graph showing the influence of different dimensions of such an arc of the filter structure on the isolation. The graph shows that the isolation is best when the subtended angle defining the arc length is 43°, proving that the higher order mode is better filtered by the arc.

FIGS. 8*a* to 8*d* show radiation patterns of the four omnidirectional modes of an embodiment of the dielectric resonant antenna according to the present invention. It is shown that the co-polarization is symmetrical and is not distorted, which verifies that the modes corresponding to different ports can work simultaneously without interfering with each other thus the proposed DRA can achieve duplex function. The realized gain can reach 1 dBi. It can be seen that the cross-polarization is lower than −15 dB for most angels in both E-plane and H-plane.

It is shown from the figures that the x-y plane that the radiation pattern of co-polarization is approximately a circle, and the non-uniformity is within 2 dB, which indicates that a uniform feeding and good omnidirectional radiation characteristics is realized.

An embodiment of the four-port omnidirectional antenna is operable at 1.8 Ghz and 3.9 Ghz at the same time, and the compared bandwidth is 6.5% and 6.3%, respectively. There are four ports corresponding to four modes: TM01δ mode, TM02δ mode, TE01δ+1 mode and TE03δ+1 mode. Each port matches well and the reflection coefficient at each port can achieve lower than −15 dB. Besides, each port can motivate an omnidirectional radiation pattern which is symmetrical.

In a duplex application, any two of the two TM modes and two TE modes can operate simultaneously at two distinct frequency bands with a large frequency ratio.

The results of the simulation, as illustrated in FIGS. 4 to 7, demonstrate that the isolation between any two ports can be maintained at below or close to −20 dB across the entire working frequency band. In certain port combinations, the isolation can be lower than −30 dB. The achievement of such a high level of isolation with a single antenna, without the addition of any couplers or parasitic structures, represents a significant advancement in the field of duplex systems, offering a highly practical and useful solution.

What is claimed is:

1. A four-port omnidirectional antenna comprising:

(i) a dielectric resonator, (ii) a first substrate in contact with the dielectric resonator, comprising a first set of feed lines adapted for providing a fundamental transverse magnetic (TM) mode in a lower frequency band, and a second set of feed lines adapted for providing a high order TM mode in a higher frequency band;

(iii) a second substrate in contact with the first substrate, comprising a third set of feed lines adapted for providing a fundamental transverse electric (TE) mode in the lower frequency band, and a fourth set of feed lines adapted for providing a high order TE mode in the higher frequency band;

wherein the first, second, third and fourth set of feed lines are configured to isolate fields excited by each of the two TM modes and the two TE modes, thereby enabling independent operation between each of the two TM modes and the two TE modes.

2. The four-port omnidirectional antenna according to claim 1, wherein the antenna is a duplex antenna adapted to receive and transmit data simultaneously at any two of the two TM modes and two TE modes at two distinct frequency bands.

3. The four-port omnidirectional antenna according to claim 2, wherein the two distinct frequency bands include a first frequency band of 1.8 Ghz and a second frequency band of 3.9 Ghz.

4. The four-port omnidirectional antenna according to claim 1, wherein the first set of feed lines is electrically interconnected and fed by a first power divider to form a first feed network.

5. The four-port omnidirectional antenna according to claim 4, wherein the first power divider is disposed radially between the third set of feed lines and the fourth set of feed lines on the second substrate, and comprises circumferentially extending arc strips with cascading structures along the radial direction adapted to provide a first order and a second order of power division.

6. The four-port omnidirectional antenna according to claim 5, wherein the circumferentially extending arc strips include a first arc strip adapted to provide the first order of power division, wherein the first arc strip has a circumferential span of 180 degrees.

7. The four-port omnidirectional antenna according to claim 6, further comprising a filter structure comprising an arc adapted to eliminate coupling between the first set of feed lines and the second set of feed lines, wherein the arc has a dimension comparable to a wavelength associated with the frequency band of the high order TM mode.

8. The four-port omnidirectional antenna according to claim 4, wherein the first set of feed lines comprises four stubs extending radially in an outer region relative to the second set of feed lines, and wherein each of the four stubs is separated from each other by an angular span of 90 degrees.

9. The four-port omnidirectional antenna according to claim 1, wherein the second set of feed lines is fed from a central via with a central patch to form a second feed network.

10. The four-port omnidirectional antenna according to claim 9, wherein the second set of feed lines comprises four shorting stubs extending radially at the centre of the first substrate, wherein the four shorting stubs are positioned orthogonally to each other while being connected to each other at the centre patch.

11. The four-port omnidirectional antenna according to claim 1, wherein the third set of feed lines is electrically interconnected and fed from a second power divider to form a third feed network.

12. The four-port omnidirectional antenna according to claim 11, wherein the second power divider is disposed in an outermost region of the second substrate.

13. The four-port omnidirectional antenna according to claim 11, wherein the third set of feed lines comprises a first loop consisting of four discrete angular strips in an outer region relative to the fourth set of feed lines, wherein each of the four discrete angular strips of the first loop has a first arc length defined by a first subtended angle.

14. The four-port omnidirectional antenna according to claim 1, wherein the fourth set of feed lines is electrically interconnected and fed by a third power divider to form a fourth feed network.

15. The four-port omnidirectional antenna according to claim 14, wherein the third power divider is positioned at an innermost region of the second substrate.

16. The four-port omnidirectional antenna according to claim 14, wherein the fourth set of feed lines comprises a second loop comprising of four discrete angular strips in an inner region relative to the third set of feed lines, wherein each of the four discrete angular strips of the second loop has a second arc length defined by a second subtended angle.

17. The four-port omnidirectional antenna according to claim 14, further comprising a grounded coplanar waveguide (GCPW) structure positioned around the third power divider on the second substrate to reduce cross-polarization.

18. The four-port omnidirectional antenna according to claim 1, wherein the first substrate and the second substrate are circular and planar, and are stacked on a common axis of rotation.

19. The four-port omnidirectional antenna according to claim 1, wherein the dielectric resonator is in a shape of a cylinder, and is formed of a material having a dielectric constant of 5.

* * * * *